United States Patent [19]

Williams

[11] Patent Number: 4,946,126

[45] Date of Patent: Aug. 7, 1990

[54] SELF-LOCKING FASTENERS AND IN ARTICLES SUPPORTED THEREBY

[75] Inventor: David A. Williams, Hawthorne, Calif.

[73] Assignee: Hughes Aircraft Company, Los Angeles, Calif.

[21] Appl. No.: 190,919

[22] Filed: May 6, 1988

[51] Int. Cl.$^5$ .............................................. A47G 1/24
[52] U.S. Cl. ................................... 248/476; 248/179; 411/271
[58] Field of Search ............... 248/476, 278, 479, 183, 248/485, 487, 179; 74/479, 84.15; 350/633, 634; 372/107, 108; 411/184, 185, 271, 325, 265

[56] References Cited

U.S. PATENT DOCUMENTS

| | | | |
|---|---|---|---|
| 3,048,416 | 8/1962 | Rogers | 279/2 |
| 3,352,343 | 11/1967 | Stitt | 411/271 |
| 3,436,050 | 4/1969 | Tibbals | 350/633 X |
| 3,700,313 | 10/1972 | Karr | 350/633 |
| 4,638,486 | 1/1987 | Dost et al. | 372/107 |
| 4,648,692 | 3/1987 | Kinoshita | 248/479 |
| 4,657,361 | 4/1987 | Eitel | 248/476 |
| 4,680,771 | 7/1987 | Koseki | 372/108 X |

FOREIGN PATENT DOCUMENTS 2305108 11/1976 France ................. 411/271

Primary Examiner—J. Franklin Foss

Attorney, Agent, or Firm—William J. Streeter; Wanda K. Denson-Low

[57] ABSTRACT

A self-locking screw (30) assures uniform mating and locking between its threads (64) and those (70) of an article (68) into which the screw is threaded. A head (34) includes a central portion (54) and an annular outer portion (52) which surrounds the central portion and which carries the screw threads on its periphery. Slots (18) extend through the head to a base (32) to segregate the head into segments (40). Annularly configured joints (60) respectively join the segments of the outer portion to the central portion and include tubular openings (56, 58) which extend from the joints and which are positioned between the segments of said central and outer portions. A hole (42) including cylindrical (44) and conical (46) portions respectively extend through the base and the head, and from the tubular hole portion and through the head. A bolt (72), including a cylindrical shaft (74) and an enlarged head (76) with a conical surface (78) which joins said head to said shaft and which engages the conical hole portion, first pivots both the central portion and the outer portion segments as a unit about the base to initially lock an upper portion of the screw threads and the article threads together, and then pivots the outer portion segments with respect to both the central portion segments and the base as a unit to lock together the remaining screw threads with substantial uniformity and the threads of the article.

18 Claims, 2 Drawing Sheets

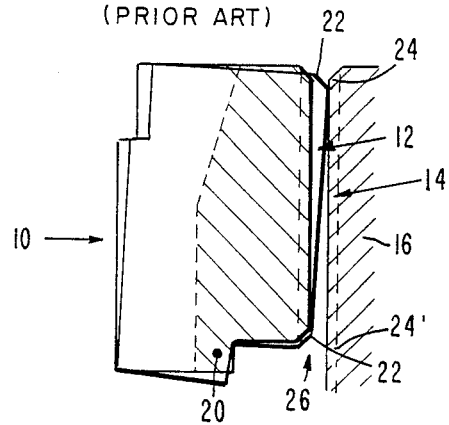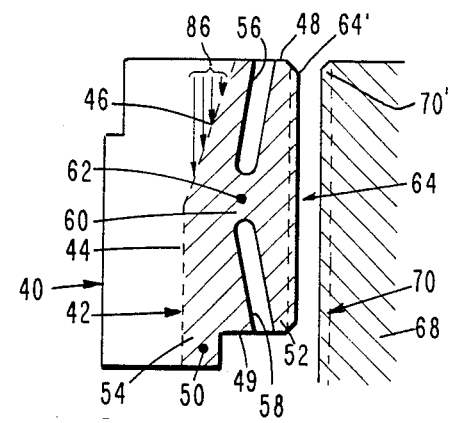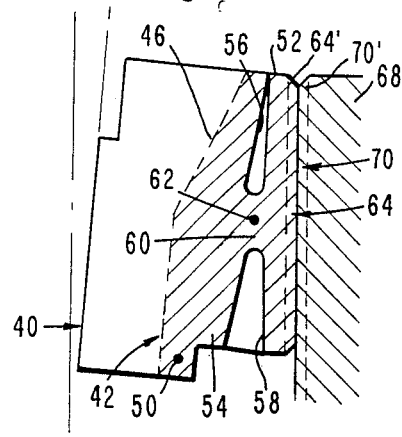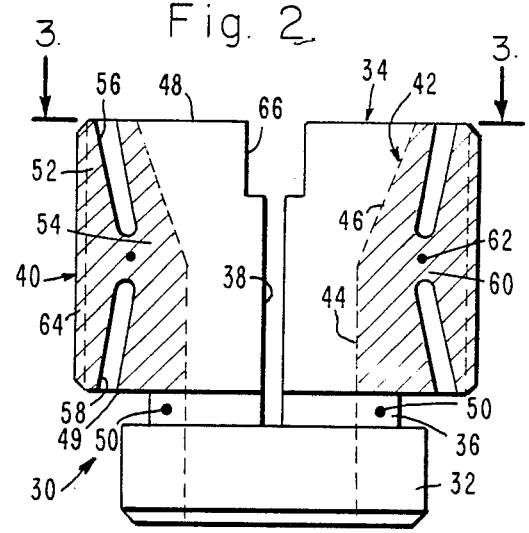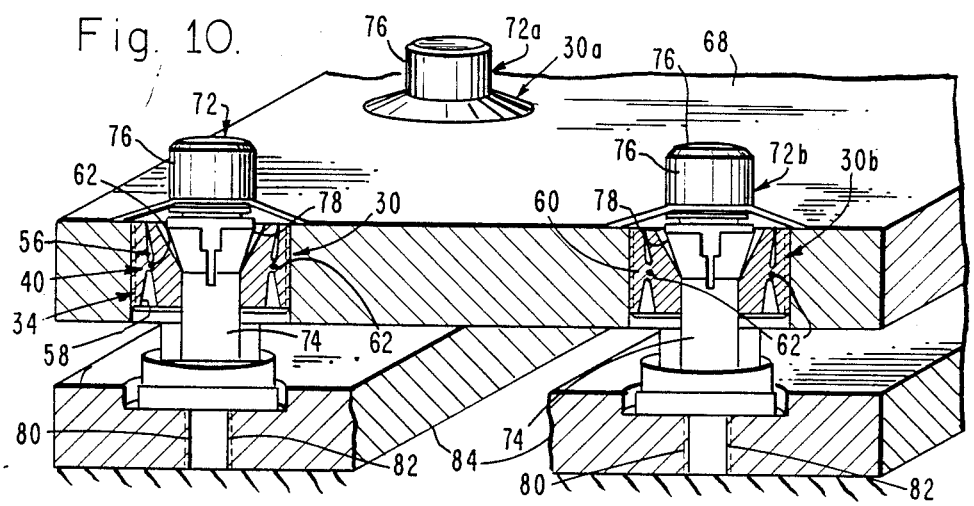

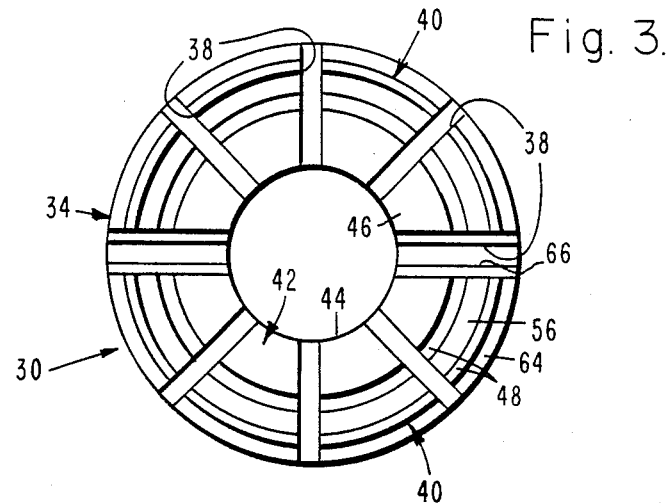
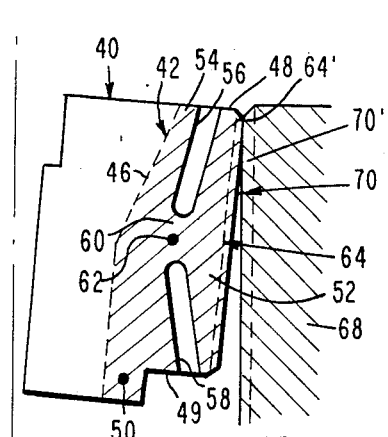
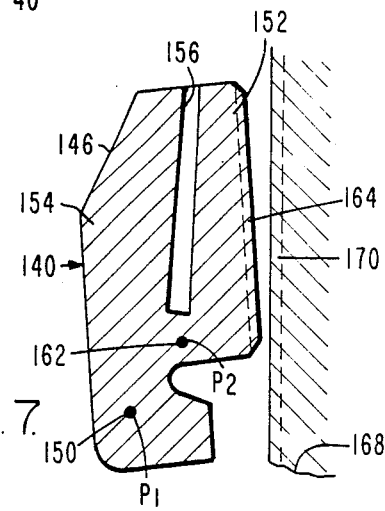
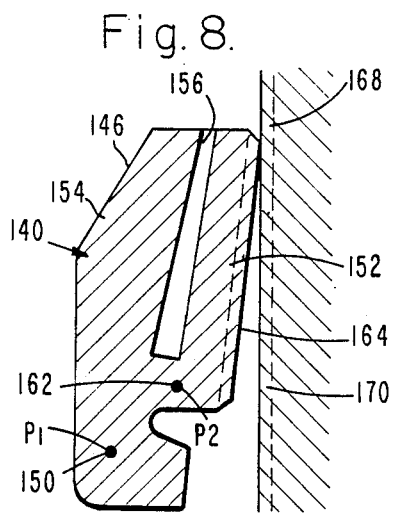
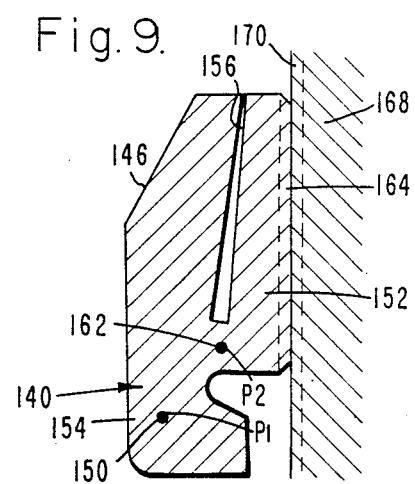

SELF-LOCKING FASTENERS AND IN ARTICLES SUPPORTED THEREBY

BACKGROUND OF THE INVENTION

The present invention relates to self-locking fasteners and, in particular, to improvements therein for assuring uniform locking between the mating peripheries of the self-locking fastener and of the article into which the fastener is threaded, and further to use of such fasteners in relieving stresses in supporting reflective and other surfaces.

Conventional fasteners, such as self-locking screws, as exemplified in FIG. 1, are slotted to provide segments which, for screws are peripherally threaded. The fastener is first inserted or threaded into engagement with a mating surface or screw threads of an article. A bolt or other spreading object, placed within the self-locking fastener/screw, then forces the segment and its periphery and any threads therein into locking engagement with the surface/threads of the article, so that the fastener/screw no longer can rotate. Such an arrangement, as will be more fully described with respect to FIG. 1, provides a narrow annular locking contact of the segments with the article surface or threads. While acceptable in some applications, the lack of full locking contact is not acceptable for other applications, such as discussed below.

In addition, when such fasteners and screws are utilized as supports for precisely positioned optical elements such as reflective surfaces, the use of such screws or other conventionally used supports often results in optical distortions of plates supporting the reflective surfaces, excessive wear of the threads, and slippage of the locking engagement. In particular, when adjusting the optical alignment of such elements, three adjustment fasteners, which commonly comprise screws, are placed in a point support triangular pattern to enable one article to be tilted with respect to its support and, thereafter, to hold them in a locked position after adjustment of the tilt. When one point support is displaced from its original setting, the original plane is effectively rotated into a new plane, about an axis formed by the other two pivot points provided by the screws. Conversely, if all three points are constrained so as not to move, the plane will remain in that oriented position.

Such a plane may comprise the reflective surface of a mirror, which is mounted on a plate and held relative to another structure in an optical system. For alignment and retention of the mirror relative to the optical system, it is necessary to control the distances of the mirror surface as measured along the three perpendicular lines from the surface to the pivot points defined by the three adjustment screws. The environment of such an optical system often is not stable, being subject to jolts and bending motions exerted thereon, and can cause one or more screws to slip. Even a small slip may misalign the optical alignment of the system. Therefore, stability is only as good as the extent to which the adjustment screws do not creep after having been locked in place.

In addition, during the alignment operation, the plates are drawn together after their adjustment screws are turned to provide an initial spacing between the plate and its support, after which the initial locking engagement between mating threads fixes the spacing. The screws may need to be further adjusted slightly after a certain thread pressure has been achieved in the initial locking engagement and, in so doing, causes excessive abrasion and galling in the threads with possible lack of a solid metal-to-metal contact caused by debris which may also contaminate the optical system. Thus, the plates are held sufficiently tightly together to maintain accuracy of alignment, while the screws are released only to the extent necessary for readjustment. Because the locking between threads is essentially an annular contact comprising arcs, those portions of the screws at the annular point contact become distorted and/or galled.

A third problem also exists with use of three adjustment screws. During the adjustment, two screws are held in position while a third is adjusted so as to adjust the tilt of the reflective surface. As one screw moves with respect to the others to cause the tilting of the reflective surface and the plate into which the screws are threaded, the bolts which spreads the screws arcuately bend. Such bending may either damage the screws or, if the screws are sufficiently rigid in their locked positions, distort the plate and its reflective surface. The bending of the bolts also causes spring energy to be stored therein and, when the spring energy is released, the bolt will move or the threads will slip and will result in misaligning the prior adjustment.

SUMMARY OF THE INVENTION

These problems and other considerations are successfully addressed in the present invention by enabling uniform locking of substantially the entire periphery of a self-locking fastener with the mating periphery of an article into which it is inserted, and by allowing two or more such fasteners to pivot when used as supports.

Specifically, the self-locking fastener includes a central portion coupled to an outer portion, whose outer peripheral surface may carry screw threads. The fastener is first engaged or threaded into a mating surface of an article. The outer portion and the central portion are then pivoted as a unit towards the mating article surface sufficient to provide initial locking engagement between the tops of the two surfaces and any screw and article threads formed therein. The outer or thread carrying portion is then pivoted with respect to the central portion towards the article surface to close the gap between the surfaces, sufficient for providing the substantial uniform locking between the fastener and article surfaces and any mating screw and article threads therein.

When the article is secured to a support by three such fasteners, any bending movements exerted on the article to any of the fasteners are substantially absorbed by their pivots.

Several advantages are derived from this arrangement. Primarily, full contact is achieved in a self-locking fastener, such as a screw, along the entire mating lengths of the fastener's periphery and the article surface and, for a threaded fastener, of the threaded sections. Such full contact provides uniform pressure along the mating surfaces and in the threads and, hence, less wear of the surfaces and the threads during alignment; consequently less contaminants are formed, than those which are produced in prior fasteners, such as from galling. In optical systems utilizing three such fasteners, a greater force can be applied to an adjustment plate through the engaging surfaces or threads, without overloading the mating surfaces or threads during final adjustment of the plates. In addition, the pivots incorporated in the self-aligning fasteners/screws permit slight angular plate motions without exerting bending forces on optical reflective surfaces carried by the plate or on the attachment fasteners or screws.

Other aims and advantages, as well as a more complete understanding of the present invention, will appear from the following explanation of exemplary embodiments and the accompanying drawings thereof.

DESCRIPTION OF THE DRAWINGS

FIG. 1 is a cross-sectional view of one half of a prior art self-locking screw showing its threads both prior to and in final engagement with the threads of an article into which the self-locking screw is threaded;

FIG. 2 is a cross-sectional view of the preferred embodiment of the inventive self-locking fastener, illustrated as a screw, constructed according to the concepts of the present invention;

FIG. 3 is a top view of the self-locking screw of FIG. 2 and taken along the plane denoted by line 3—3 thereof;

FIGS. 4–6 illustrate sequential engagement into full, uniform locking between the mating threads of the self-locking screw shown in FIG. 2 and of the article into which the self-locking screw is threaded;

FIGS. 7–9 depict a second embodiment of the present invention; and

FIG. 10 is a cross-sectional view of the preferred embodiment of the self-locking screw fastener of the present invention providing attachment without stress between an article and its support.

DETAILED DESCRIPTION OF THE PREFERRED EMBODIMENTS

While the present invention is directed to fasteners in general, because such fasteners commonly are embodied as screws, the following description will be directed to self-locking screws; however, it is to be understood that the invention is not to be limited thereto.

Referring to FIG. 1, a prior art self-locking screw includes a segment 10 which is shown in its final position of locking engagement of its screw or threaded surface 12 with a mating threaded surface 14 of an article 16. For purposes of illustration, both threads 12 and 14 show only portions 22 and 24 in engagement; however, in actuality, threads 12 and 14 are engaged or meshed together, with portions 22 and 24 being pressed together in a locking engagement, as distinguished from a lesser degree of engagement or meshing between lower portions 22' and 24', in order to magnify a gap 26 existing between portions 22' and 24'. Conventionally, a bolt having a conical, beveled or other sloped inner surface is drawn or moved downwardly with respect to segment 10 against a surface 18 thereof. This causes the segment to pivot about an arc centered at a point 20 and to form a contact about the periphery at a narrow arc at the upper thread portions 22 and 24 of threads 12 and 14. Gap 26, formed between bottom portions 22' and 24' of the threads and the sole locking, high pressure engagement at portions 22 and 24, results in many of the galling and other problems referred to earlier.

The improvement of the present invention, shown in FIGS. 2 and 3, comprises a self-locking screw 30 having a base 32 and a head 34. The head is joined to the base by a reduced, generally annular connecting portion 36. A plurality of slots 38, for example numbering four, extends entirely through head 34 and terminates at base 32 in order to divide the head into a plurality of eight segments 40. A figure of revolution about the screw axis, which is a tubular hole in cross-section, comprises a tubular hole 42, which includes a cylindrical portion 44 and a conical portion 46, extends entirely through screw 30, with the cylindrical portion extending through both the head and the base, and the conical portion extending only through the head towards its upper surface 48. As a result of this construction, segments 40 can pivot with respect to base 32 through reduced generally annular connecting portion 36, as defined generally by an annular pivot or pivot area denoted by indicium 50.

Head 34 and its segments 40 are divided into an annular outer or thread supporting portion 52 and a central or remaining portion 54. A pair of tubular or slotted openings 56 and 58 are cut into the head respectively from its upper surface 48 and its lower surface 49 and terminate within the head to form a connecting portion or joint 60 which also provides an arced pivot or pivot area 62. As shown, tubular openings 56 and 58 extend outwardly toward the periphery of the head in which threads 64 are formed. While joint 60 is centered in head 34, it may be displaced from the center so that openings 56 and 58 do not have equal depths. In addition, joint 60 need not be a web connection, but may comprise a ball or other bearing.

Screw 30 is completed by a screw driver slot 66, which enlarges the upper portion of one of slots 38. Sequential engagement of self-locking screw 30 with an article 68 and its threads 70 is depicted in FIGS. 4–6. The illustration in FIG. 4 diagramatically shows a spacing between threads 64 and 70; however, just as shown for illustrative purposes in FIG. 1, in reality this spacing does not exist; rather, thread 64 simply engages thread 70 when screw 30 is threaded into article 68. However, for illustrative purposes, a gap is shown therebetween to facilitate an understanding of the operation of the present invention. Thus, in FIG. 4, screw 30 is considered to be threaded into article 68, prior to locking threads 64 and 70 together.

For the sequential locking between the threads, reference to FIG. 10 is briefly made to describe the use of a bolt 72 or the equivalent, which comprises a cylindrical shaft 74 and a head 76. The head is larger than the shaft and is joined thereto by a conical or tapered surface 78. Alternatively, a tapered bushing may be used. The shaft is terminated by a thread 80 which engages a similar thread 82 of a support 84.

Referring now to FIG. 4, screw 30 is shown in position to commence the locking function. Bolt 72 with its tapered or conical surface 78 is placed against conical surface 46 of hole 42. Upon downward movement of bolt 72 in the direction of arrowheads 86, the force exerted by conical surface 78 against surface 46 pivots segment 40, along with central or remaining portion 54 and annular outer or thread supporting portion 52 as a unit, about arced pivot 50 and forces upper annular surface 64' of thread 64 into tight locking contact with upper surface 70' of thread 70, as shown in FIG. 5. At this point, the configuration of the present invention is where the prior art configuration shown in FIG. 1 ends. However, in the present invention, as illustrated in FIG. 6, continued downward motion of bolt 72 and its conical surface 78 against mating conical surface 46 of hole 42 causes thread supporting portion 52 to pivot about arced pivot 62 of joint 60 with respect to remaining portion 54 using the contact between thread portions 64' and 70' as a cooperating pivot. This further motion partially closes tubular opening 56 and opens tubular portion 58 to the configuration of FIG. 6 to a complete and uniform, that is, a substantial locking, locking between the entirety of screw threads 64 and 70, as distinguished from gap 26 which occurs in the prior art as shown in FIG. 1.

In the alternate embodiment illustrated in FIGS. 7-9, a segment 140 is provided with a single tubular opening 156. Segment 140 is divided into an annular outer or thread supporting portion 152 and a central or remaining portion 154. Threads 164 on portion 152 are in simple engagement with threads 170 of an article 168.

In operation, movement of a bolt against a conical surface 146 first pivots segment 140 about an arced pivot 150 until the upper portion of thread 164 is locked against article thread 170, as shown in FIG. 8. Upon further downward movement of the bolt against surface 146, segment 140 pivots along arced pivot 162 to completely close the gap in opening 156 and to bring a complete locking interface between threads 164 and 170, as shown in FIG. 9.

In this embodiment, the gap at the bottom of the mating threads, as shown in FIG. 8, is correlated to the spacing between the walls of opening 156, in order to permit a sufficient closing of opening 156 but not necessarily a complete closing until the full intermeshing locking of the threads is completed.

Referring now to FIG. 10, article 68 is shown coupled to support 84 by three self-locking screws 30, 30a and 30b and bolts 72, 72a and 72b. Locking screws 30a and 30b are constructed the same as screw 30. Here, the adjustment of article 68, which may be provided with a reflective surface, is adjusted by rotating each screw 30, 30a and 30b to set the spacing between article 68 and support 84 at each screw. Bolts 72, 72a and 72b are then tightened so that screws 30, 30a and 30b are tightly locked in article 68, that is, their outer threaded peripheries 64 are in locking engagement with threaded holes 70 of article 68. Adjustment of one or more of the screws aligns the reflecting surface of article 68 as appropriate, without appreciable stress in any of the bolts or the surface. The avoidance or minimizing of stress occurs because the arced pivots 62 provided in each of the screws through planes passing through joints 60 permit outer or thread supporting portions to pivot with respect to bolts 72, 72a and 72b and central screw portion 54.

Although the invention has been described with respect to particular embodiments thereof, it should be realized that various changes and modifications may be made therein without departing from the spirit and scope of the invention.

I claim:

1. A self-locking fastener
having a peripheral surface which is matable with a surface of an article, comprising:
a first portion that supports the peripheral surface;
a remaining portion coupled to said first portion; and
means for enabling uniform locking of substantially the entire peripheral surface with the surface of the article including means for enabling movement of said first portion with respect to said remaining portion, said movement enabling means comprising
joint means joining said first portion and said remaining portion, and
means defining a tubular opening extending from said joint means and being positioned between said first portion and said remaining portion.

2. A self-locking fastener having a peripheral surface which is matable with a surface of an article, comprising:
a first portion that supports the peripheral surface;
a remaining portion coupled to said first portion; and
means for enabling uniform locking of substantially the entire peripheral surface with the surface of the article including means for enabling movement of said first portion with respect to said remaining portion, said movement enabling means comprising
joint means joining said first portion and said remaining portion, and
means defining a pair of tubular openings extending from opposite sides of said joint means and being positioned between said first portion and said remaining portion.

3. A fastener according to claim 2 in which said openings means respectively slope outwardly from said joint means towards the peripheral surface.

4. A fastener according to claim 3 in which said first portion has screw threads in its peripheral surface and said article surface has mating threads therein.

5. A self-locking fastener having a peripheral surface which is matable with a surface of an article, comprising:
a first portion including segments that supports the peripheral surface;
a remaining portion coupled to said first portion, and including a base and segments supported thereon; and
means for enabling uniform locking of substantially the entire peripheral surface with the surface of the article including means for enabling movement of said first portion with respect to said remaining portion, said movement enabling means including pivotable coupling means comprising
joint means respectively joining said segments of said first portion to said segments of said remaining portion,
means defining a tubular opening extending from said joint means and positioned between said first portion and said remaining portion,
means for enabling said first portion to pivot with respect to said remaining portion, thereby to uniformly seat substantially the entire peripheral surface of said first portion with the surface of the article,
means for establishing a pivotable arrangement between said base and said segments, and
means first for pivoting both said remaining portion segments and said first portion as a unit about said pivotable arrangement to initially engage the peripheral surface with the article surface, and then for pivoting said first portion segments with respect to both said remaining portion segments and said base as a unit about said pivotable coupling means to lock the periphery with substantial uniformity with the surface of the article.

6. A self-locking fastener having a peripheral surface which is matable with a surface of an article, comprising:
a first portion including segments that supports the peripheral surface;
a remaining portion coupled to said first portion, and including a base and segments supported thereon; and means for enabling uniform locking of substantially the entire peripheral surface with the surface of the article including means for enabling movement of said first portion with respect to said remaining portion, said movement enabling means comprising
joint means respectively joining said segments of said first portion to said segments of said remaining portion,
means defining a pair of tubular openings extending from opposite sides of said joint means and positioned between said first portion and said remaining portion,
means for enabling said first portion to pivot with respect to said remaining portion, thereby to uniformly seat substantially the entire peripheral surface of said first portion with the surface of the article,
means for establishing a pivotable arrangement between said base and said segments, and
means first for pivoting both said remaining portion segments and said first portion as a unit about said pivotable arrangement to initially engage the peripheral surface with the article surface, and then for pivoting said first portion segments with respect to both said remaining portion segments and said base as a unit about said pivotable coupling means to lock the periphery with substantial uniformity with the surface of the article.

7. A selflocking fastener having a peripheral surface which is matable with a surface of an article, comprising:
a first portion including segments that supports the peripheral surface;
a remaining portion coupled to said first portion, and including a base and segments supported thereon; and
means for enabling uniform locking of substantially the entire peripheral surface with the surface of the article, including means for enabling movement of said first portion with respect to said remaining portion, said movement enabling means comprising annularly configured joint means joining said first portion and said remaining portion,
means defining a cylindrical opening extending from said joint means and positioned between said first portion and said remaining portion,
means for enabling said first portion to pivot with respect to said remaining portion, thereby to uniformly seat substantially the entire peripheral surface of said first portion with the surface of the article,
means for establishing a pivotable arrangement between said base and said segments, and
means first for pivoting both said remaining portion segments and said first portion as a unit about said pivotable arrangement to initially engage the peripheral surface with the article surface, and then for pivoting said first portion segments with respect to both said remaining portion segments and said base as a unit about said pivotable coupling means to lock the periphery with substantial uniformity with the surface of the article, said means for pivoting said segments comprising
a cylindrical shaft having an enlarged head and a conical surface joining said head to said shaft, and
means defining a cylindrical hole centered in said base, said segments and said thread supporting portion,
said hole means including a cylindrical tubular surface and a conical surface respectively receiving said shaft and said head, said hole means and said shaft being sized to enable movement of said shaft within said hole means and engagement of said conical surfaces of said head and said hole means to sequentially cause said first and second pivoting.

8. A self-locking fastener having a peripheral surface which is matable with a surface of an article, comprising:
a first portion including segments that supports the peripheral surface;
a remaining portion coupled to said first portion, and including a base and segments supported thereon; and
means for enabling uniform locking of substantially the entire peripheral surface with the surface of the article, including means for enabling movement of said first portion with respect to said remaining portion, said movement enabling means comprising annularly configured joint means joining said first portion and said remaining portion,
means defining a pair of cylindrical openings extending from opposite sides of said joint means and positioned between said first portion and said remaining portion,
means for enabling said first portion to pivot with respect to said remaining portion, thereby to uniformly seat substantially the entire peripheral surface of said first portion with the surface of the article,
means for establishing a pivotable arrangement between said base and said segments, and
means first for pivoting both said remaining portion segments and said first portion as a unit about said pivotable arrangement to initially engage the peripheral surface with the article surface, and then for pivoting said first portion segments with respect to both said remaining portion segments and said base as a unit about said pivotable coupling means to lock the periphery with substantial uniformity with the surface of the article, said means for pivoting said segments comprising
a cylindrical shaft having an enlarged head and a conical surface joining said head to said shaft, and
means defining a cylindrical hole centered in said base, said segments and said thread supporting portion,
said hole means including a cylindrical tubular surface and a conical surface respectively receiving said shaft and said head, said hole means and said shaft being sized to enable movement of said shaft within said hole means and engagement of said conical surfaces of said head and said hole means to sequentially cause said first and second pivoting.

9. A fastener according to claim 8 in which said openings means respectively slope outwardly from said joint means towards said peripheral surface.

10. A self-locking screw for assuring uniform mating and seating between its threads and those of an article into which the screw is threaded comprising;

a base;

a head including a central portion and an annular outer portion surrounding said central portion, said outer portion having the screw threads on its periphery, and means defining slots extending through said head to said base to segregate said head portion into segments;

annularly configured joints respectively joining said segments of said outer portion to said central portion and including tubular opening means extending from said joint means and positioned between said segments of said central and outer portions;

means defining a hole including a cylindrical hole portion extending through said base and head, and a conical hold portion extending from said tubular hole portion and through said head; and a bolt including a cylindrical shaft and an enlarged head and a conical surface which joins said head to said shaft and which engages said conical hole portion first for pivoting both said central portion and said outer portion segments as a unit about said base to initially engage the screw threads with the article threads, and then for pivoting said outer portion segments with respect to both said central portion segments and said base as a unit to seat the screw threads with substantial uniformity with those of the article.

11. A screw according to claim 10 in which said opening means comprises a pair of tubular openings extending from opposite sides of said joint means.

12. A screw according to claim 11 in which said openings means respectively slope outwardly from said joint means towards the screw threads.

13. A substantially stress-free assembly of an article and a support comprising:

means defining at least one first connection between the article and the support; and pivot means defining a second connection between the article and the support for absorbing any bending movements exerted on said pivot means by disturbances exerted on said first connection, said pivot means comprising means defining an opening in the article having an inner surface, a self-locking fastener having a periphery matable with said article surface, and including a base, a head including a central portion and an outer portion which supports said periphery and which is coupled to said central portion by joint means, and means defining slots extending through said head to said base to segregate said head portion into segments, and means for enabling pivoting of said outer portion about said joint means with respect to said central portion, said joint means comprising annularly configured joints respectively joining said segments of said outer portion to said central portion and including tubular opening means extending from said joint means and positioned between said segments of said central and outer portions;

means defining a hole including a cylindrical hole portion extending through said base and head, and a conical hole portion extending from said tubular hole portion and through said head; and a bolt including a cylindrical shaft and an enlarged head and a conical surface which joins said head to said shaft and which engages said conical hole portion first for pivoting both said central portion and said outer portion segments as a unit about said base to initially engage the periphery with the article surface, and then for pivoting said outer portion segments with respect to both said central portion segments and said base as a unit to lock the periphery with substantial uniformity with the article surface.

14. An assembly according to claim 13 in which the periphery and the article surface have mating threads respectively therein.

15. An assembly according to claim 13 in which said opening means comprises a pair of tubular openings extending from opposite sides of said joint means.

16. An assembly according to claim 15 in which said openings means respectively slope outwardly from said joint means towards the periphery.

17. An assembly according to claim 13 further including a third connection between said article and said support, in which each said connection is constructed as said pivot means for enabling rotation of the article with respect to the support and thereby for relieving stresses exerted on the article by means of said joint means of said respective pivot means.

18. An assembly according to claim 17 in which the periphery and the article surface have mating threads respectively therein.

* * * * *